United States Patent
Harrison et al.

(10) Patent No.: US 10,087,301 B2
(45) Date of Patent: Oct. 2, 2018

(54) DEWATERING DEVULCANIZED RUBBER

(71) Applicant: RUBRECO INC., Fredericton (CA)

(72) Inventors: Brian Harrison, Kanata (CA); Hurdon A. Hooper, Fredericton (CA); Matthew Ness, Fredericton (CA)

(73) Assignee: RUBRECO INC., Fredericton (CA)

( * ) Notice: Subject to any disclaimer, the term of this patent is extended or adjusted under 35 U.S.C. 154(b) by 40 days.

(21) Appl. No.: 15/205,637

(22) Filed: Jul. 8, 2016

(65) Prior Publication Data
US 2017/0009042 A1 Jan. 12, 2017

Related U.S. Application Data

(60) Provisional application No. 62/191,019, filed on Jul. 10, 2015.

(51) Int. Cl.
*C08J 11/02* (2006.01)

(52) U.S. Cl.
CPC ............ *C08J 11/02* (2013.01); *C08J 2317/00* (2013.01)

(58) Field of Classification Search
CPC ........ C08L 19/00; C08L 19/003; C08L 23/00; C08L 23/16; C08L 23/22; C08J 11/02; C08J 11/08; C08J 2317/00; C08J 2321/00
See application file for complete search history.

(56) References Cited

U.S. PATENT DOCUMENTS

| | | | |
|---|---|---|---|
| 5,304,576 A * | 4/1994 | Martinez | B29B 17/0206 |
| | | | 152/DIG. 16 |
| 7,166,658 B2 | 1/2007 | Harrison et al. | |
| 8,415,402 B2 | 4/2013 | Harrison et al. | |
| 2004/0214906 A1 * | 10/2004 | Harrison | C08J 11/14 |
| | | | 521/41 |
| 2011/0212003 A1 | 9/2011 | Harrison et al. | |
| 2014/0148522 A1 | 5/2014 | Harrison et al. | |
| 2015/0014223 A1 * | 1/2015 | Fan | B01D 11/0288 |
| | | | 208/390 |

FOREIGN PATENT DOCUMENTS

| | | | |
|---|---|---|---|
| GB | 535531 | * | 4/1941 |
| WO | 2014082172 A1 | | 6/2014 |

* cited by examiner

*Primary Examiner* — Frances Tischler
(74) *Attorney, Agent, or Firm* — Pearne & Gordon LLP

(57) ABSTRACT

A method for the controlled removal of water from devulcanized rubber, comprising steps of contacting the devulcanized rubber with a solvent, dissolving the water out of the devulcanized rubber and into solution without removing other components in the rubber such as polymer, separating the devulcanized rubber from the solvent, and drying the devulcanized rubber. By controlling the amount of water that is in the solvent-solution, and/or the amount of time the devulcanized rubber is in contact with the solvent solution the amount of water that is removed can be controlled. By controlling the amount of water that is removed the rheology/viscosity (e.g. G' and G") of the devulcanized rubber can be controlled.

19 Claims, 4 Drawing Sheets

DEWATERING DEVULCANIZED RUBBER

TECHNICAL FIELD

The current disclosure relates to a process of dewatering rubber, and in particular to dewatering devulcanized rubber.

BACKGROUND

Vulcanized rubber can be devulcanized and the resultant products re-used in new goods. The resultant products of the devulcanization process may depend on the technique used to devulcanize the vulcanized rubber. For example, U.S. Pat. No. 7,166,658, which is hereby incorporated by reference in its entirety, teaches processing used tires to obtain 100% devulcanized rubber. The devulcanized rubber may then be further processed to separate the polymer from carbon black, possibly using the process described in U.S. Pat. No. 8,415,402, which is hereby incorporated by reference in its entirety. The 100% devulcanization process can result in polymer scission, which may alter the characteristics of the devulcanized rubber and may be undesirable in certain applications.

U.S. patent application Ser. No. 14/090,723, and corresponding International patent application PCT/CA20131050903, titled Vulcanized Rubber Conversion describes a process for the conversion of vulcanized rubber material, such as used tires or other scrap materials, to produce a product that is suitable for use as a component in the production of other rubber materials. When the vulcanized rubber is converted according to a process described by U.S. patent application Ser. No. 14/090,723 the devulcanized rubber cannot be separated into polymer and carbon black. However, the devulcanized rubber has characteristics suitable for inclusion in new rubber formulations as a substitute for virgin rubber. The vulcanized rubber conversion may be carried out in water at elevated temperatures and pressures. The devulcanized rubber after processing may contain 15-40% water by weight, which may be undesirably high for certain applications. The amount of water in a rubber sample may be estimated by drying the sample at 110° C. until its weight is constant for a sufficient period of time, such as 24 hours. The weight lost is assumed to be the weight of the water present in the sample.

Various techniques for removing the water from the devulcanized rubber exist, including for example, air drying at elevated temperature, or mechanically drying by squeezing between rollers or screws. However, drying at elevated temperatures may have undesirable effects on the devulcanized rubber, including making the surface hard which makes it more difficult to mix with and recombine into new products, while squeezing may not remove enough of the water from the devulcanized rubber.

An additional alternative dewatering technique for removing water from devulcanized rubber is desirable.

SUMMARY

In accordance with the present disclosure there is provided a method of dewatering devulcanized rubber comprising: bringing devulcanized rubber and a water-soluble solvent into contact; maintaining the devulcanized rubber-solvent contact for a period of time sufficient to dissolve a portion of the water from the devulcanized rubber; separating the devulcanized rubber and solvent; and drying the devulcanized rubber.

In an embodiment the solvent is a polar solvent.
In an embodiment the solvent is in a solvent solution.
In an embodiment the solvent solution is a solution of the solvent and water.
In an embodiment an amount of water in the solvent solution is used to control an amount of water dissolved from the devulcanized rubber.
In an embodiment the solvent solution is a solution of the solvent and a second solvent.
In an embodiment the solvent has a low affinity for rubber polymers.
In an embodiment the solvent is at least one of methanol, ethanol, propanol, acetone, acetonitrile, dimethylformamide, dioxane, and butanol.
In an embodiment the solvent is at least one of methanol, ethanol, and acetonitrile.
In an embodiment the solvent is methanol.
In an embodiment the solvent is miscible in water.
In an embodiment the solvent is volatile.
In an embodiment the devulcanized rubber has about 15% to about 40% water prior to dewatering.
In an embodiment wherein dewatering the devulcanized rubber removes sufficient water to meet a desired specification.
In an embodiment treated devulcanized rubber has less than about 10% water after drying.
In an embodiment treated devulcanized rubber has less than about 5% water after drying.
In an embodiment the devulcanized rubber has a particle size of 1 cm or less.
In an embodiment, the method further comprises treating the devulcanized rubber with additional solvent prior to drying the devulcanized rubber to dissolve additional water; and separating the devulcanized rubber and additional solvent prior to drying.
In an embodiment, the method further comprises treating the devulcanized rubber with additional solvent after drying to dissolve additional water; separating the devulcanized rubber and additional solvent; and drying the devulcanized rubber.
The is further provided devulcanized rubber dried according to the method described herein having less than 10% water by weight.
In another embodiment the devulcanized rubber has less than 5% water by weight.

BRIEF DESCRIPTION OF THE DRAWINGS

Features, aspects and advantages of the present disclosure will become better understood with regard to the following description and accompanying drawings in which.

DETAILED DESCRIPTION

If rubber that is 90-95% devulcanized, such as using a process described in U.S. patent application Ser. No. 14/090,723, which is hereby incorporated by reference in its entirety, is put into a non-polar solvent, about 30% of the devulcanized rubber polymer will dissolve into the non-polar solvent, and in addition, a considerable amount of the non-polar solvent, possibly up to 15 times the mass of the polymer, may be absorbed by the polymer that remains in the devulcanized rubber. This absorbed solvent can only be removed by heating it to elevated temperatures. A method is described further below for dewatering substantially devulcanized rubber that cannot be separated into polymer and carbon black. The dewatering method described can remove a portion of the water from the devulcanized rubber, without dissolving a significant amount of the devulcanized rubber polymer. Further, the amount of water removed from the devulcanized rubber may be controlled, which in turn allows for the control of the rheology/viscosity characteristics of the devulcanized rubber. Further, the dewatering method described does not require elevated temperatures that can have undesirable effects on the characteristics of the devulcanized rubber, such as the hardening of the devulcanized rubber.

Figure 1:
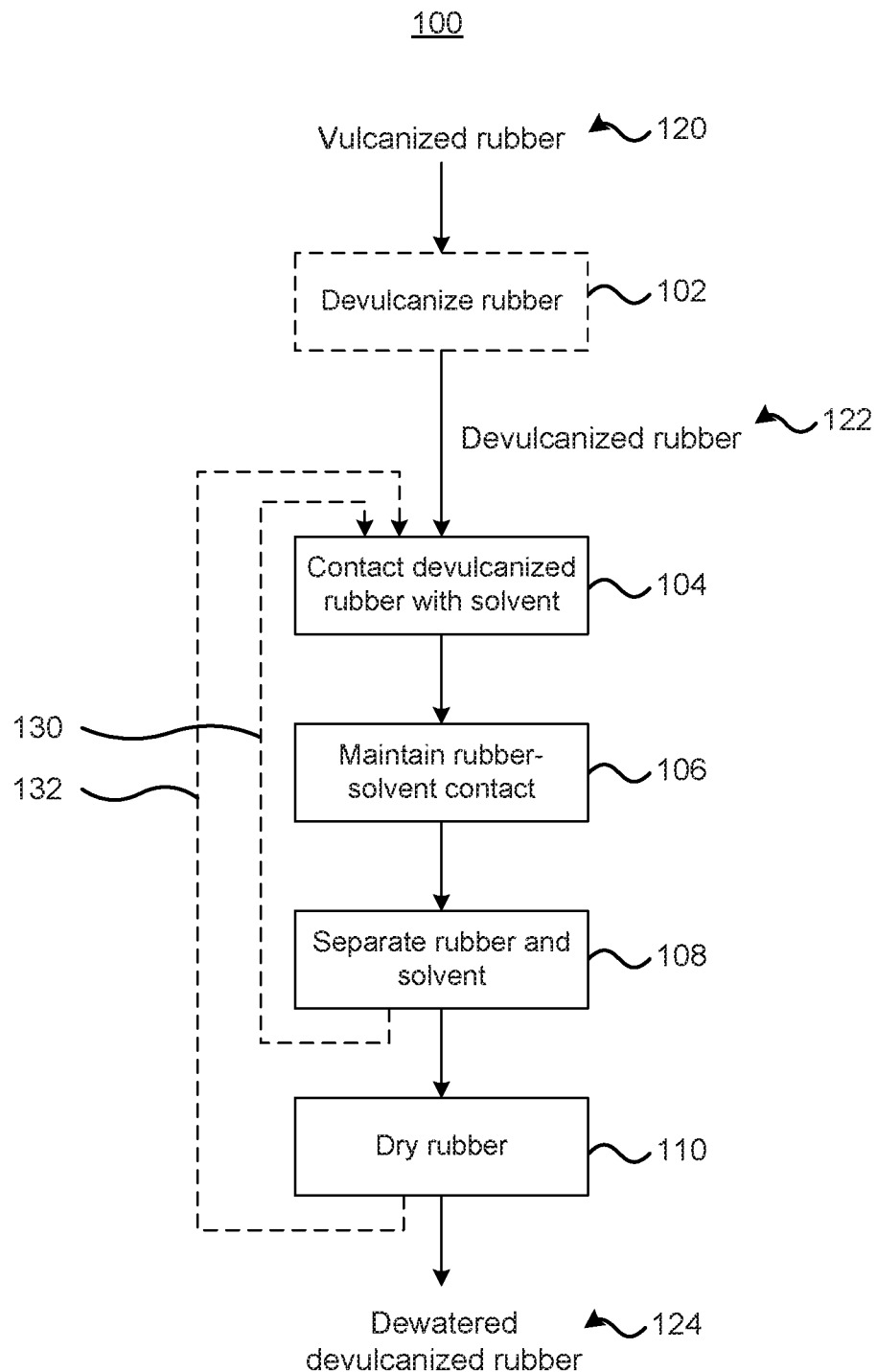
FIG. 1 depicts a method of dewatering devulcanized rubber.

FIG. 1 depicts a method of dewatering devulcanized rubber. As depicted in FIG. 1, vulcanized rubber 120 is subjected to a process (102) to devulcanize the rubber and produce the devulcanized rubber 122. The devulcanization process (102) may convert the vulcanized rubber 120 to the devulcanized rubber 122 in the presence of water at elevated temperatures and pressures as described in U.S. patent application Ser. No. 14/090,723. The devulcanized rubber 122 may be substantially devulcanized, for example in the range of about 90% to about 99%. Further, the devulcanized rubber comprises polymer and carbon black that cannot easily be separated. The devulcanized rubber 122 may have between about 15% to 40% weight water. The percentage weight of water can be determined according to:

$$\% \ Wt_{H2O} = \frac{Wt_{DriedRubber}}{Wt_{Rubber}} \times 100\%$$

Where % $Wt_{H2O}$ is the weight percent of water in the devulcanized rubber sample. $Wt_{Rubber}$ is the weight of the devulcanized rubber sample. $Wt_{DriedRubber}$ is the weight of the devulcanized rubber sample after drying at 110° C. for sufficient time for its weight to be constant for a period of time, such as 24 hours.

The devulcanized rubber 122 may be dewatered immediately following the devulcanization process or may be stored for a period of time prior to carrying out the devulcanization process.

The dewatering method 100 of the devulcanized rubber 122 begins with contacting the devulcanized rubber with a solvent (104). The solvent may be a polar solvent that is soluble, or miscible, in water. Further, the solvent has little affinity for the devulcanized rubber polymer. The rubber-solvent contact is maintained (106) for a period of time sufficient to dissolve a portion of the water from the devulcanized rubber. The amount of time required may depend upon a number of factors including the original source of the devulcanized rubber, parameters of the devulcanization process, the solvent used, and/or the desired amount of water remaining in the devulcanized rubber. Once a sufficient portion of the water has been dissolved from the devulcanized rubber, the devulcanized rubber and solvent are separated (108). Once the devulcanized rubber is separated from the solvent, it can be dried (110) to provide the dewatered devulcanized rubber.

As depicted in FIG. 1, if the initial treatment of the devulcanized rubber does not remove sufficient water, it is possible to contact the devulcanized rubber with additional solvent, either after separating the devulcanized rubber and solvent (depicted by dashed line 130) or after drying the devulcanized rubber (depicted by dashed line 132). The dewatering process can be repeated until the desired water level is achieved.

The dewatering method acts on devulcanized rubber to remove water from the devulcanized rubber. The process uses a solvent that dissolves the water from particles of devulcanized rubber. The solvent may be a polar organic solvent. Further, the selected solvent may have a high solubility in water, or may be completely miscible in water. Further, the solvent may not remove the other components in the rubber such as polymer. The solvent may have high volatility.

The particles of devulcanized rubber can be 1 centimeter or less, and can come from a variety of rubber.

Dewatering the devulcanized rubber includes bringing the devulcanized rubber into contact with the solvent and leaving it in the solvent for a period of time. After this period of time, the devulcanized rubber is removed from the solvent and air dried. As water is removed from the devulcanized rubber and dissolves in the solvent, the water level in the solvent increases. If the water level in the solvent gets too high, it can inhibit the removal of the water from the devulcanized rubber. This can be mitigated by replacing the solvent once the water level gets too high (e.g. replacing the solvent every 24 hours as in one of the examples).

In certain embodiments, the buildup of water in the solvent is prevented by replacing the solvent periodically. The inhibition of water removal due to water buildup in the solvent can be exploited to control the removal of the water and obtain devulcanized rubber with varying moisture contents. This can be achieved, for example, by adding water to the solvent to control the removal of the water (see example). Varying the moisture content of the devulcanized rubber allows the rheology (e.g. G') to be controlled (again see example).

The process may be carried out in a discontinuous batch process or as a continuous process, for example, by having a countercurrent flow of the solvent and devulcanized rubber.

In the dewatering process it is desirable to have a solvent that can remove all of the water, in a controllable fashion, without removing any of the other components in the devulcanized rubber. In a more practical sense it is desirable, or at least acceptable, to have a solvent that can remove most of the water, in a controllable fashion, while minimizing the removal of other components in the devulcanized rubber or maintaining the removal of other components below an acceptable level.

In general terms, the process will depend on the devulcanized product (rubbers used, particle size, solvent, temperature, processing conditions etc.) and small scale tests can be used to optimize the conditions for large scale dewatering processes. These tests may include, but are not limited to, mapping out the range of G that can be achieved by controlling the water content by dewatering samples of devulcanized rubber under different conditions. Once the range of G' is mapped, the desired G' for re-processing the devulcanized rubber may be selected and the processing conditions that achieved the selected G' used in large scale dewatering.

Examples

Various examples of dewatering were carried out testing various parameters. The results are set out below.

The following examples were carried out in a commercial size reactor described in US Patent Application Pub. No. 2011/0212003, the entire content of which are incorporated herein by reference, using rubber from used tires that was devulcanized at 250° or 260° C. with a nitrogen overpressure of approximately 700-800 psi in accordance with the process described in U.S. patent application Ser. No. 14/090,723. The samples had a 10-18 mesh particle size. The particles of devulcanized rubber were removed from the reactor post treatment, washed, drained, and then stored in drums. The surface of the devulcanized rubber was still wet.

Sample A:

Sample A was devulcanized at 260° C. When samples of this material were dried in an oven at 110° C. they lost 30% of their weight, which was assumed to be the total amount of water in the samples. When the samples were air dried at room temperature for two days to constant weight they lost 14% of their weight, which again was assumed to be water.

In the first set of tests approximately 10 grams of devulcanized rubber from Sample A was placed into varying volumes of methanol for 24 hours. The samples were then gravity filtered and washed with additional methanol. The devulcanized rubber was then air dried at room temperature for two days to constant weight. A small amount of material, other than water, was also extracted from the devulcanized rubber into the methanol. This is shown as the residue in the table, and was obtained by evaporating the solvent to dryness. Table 1 shows the effect of solvent volume on the amount of water removed.

TABLE 1

Effect of Solvent Volume on Water Removed

| Test Number | Volume of Methanol (mL) | Initial Weight (g) | Residue (%) | Water Removed (%) | Mass Fraction of Water in methanol at end of test |
|---|---|---|---|---|---|
| 1 | 30 | 10 | 0.5 | 25 | 0.105 |
| 2 | 50 | 10 | 0.9 | 25 | 0.060 |
| 3 | 100 | 10 | 1.2 | 26 | 0.032 |

In the table above, the water removed is shown as a weight percent and was determined according to:

Water removed (%)=(final weight+residue weight)/initial weight*100

The residue percentage was determined according to:

Residue (%)=residue weight/initial weight*100

The mass fraction of water at the end of the test was determined according to:

Mass Fraction=Mass of water/(mass of water plus mass of methanol)

Table 1 shows that, within the range shown, the devulcanized rubber to solvent volume ratio does not have a big impact on the amount of water removed from the devulcanized rubber. It can be seen however that the weight of the residue increases as the solvent volume increases possibly indicating that the residue has limited solubility in the solvent. The table shows that 25-26% of water weight was removed by a single immersion for 24 hours in methanol. It also shows that, with methanol, the residue, which is the other components of the devulcanized rubber that are undesirably being removed, can be minimized by minimizing the solvent volume to devulcanized rubber ratio.

While the devulcanized rubber to solvent ratio did not seem to have a big effect on the results, it can be seen from Table 1 that the mass fraction of water in the methanol at the end of the test can be significant.

The next table shows the effect of immersion time in the solvent on the amount of water removed.

TABLE 2

Effect of Immersion Time on Water Removed

| Test Number | Volume of Methanol (mL) | Initial Weight (g) | Immersion Time (hrs) | Residue (%) | Water Removed (%) |
|---|---|---|---|---|---|
| 4 | 150 | 15 | 4 | 0.5 | 23 |
| 5 | 150 | 15 | 8 | 0.6 | 25 |
| 6 | 150 | 15 | 16 | 0.7 | 26 |
| 7 | 150 | 15 | 24 | 0.8 | 26 |

Table 2 shows that most of the water is removed in the first four hours and that the residue slowly increases with immersion time.

The next table shows the effect of replacing the methanol after 24 hours, with the same volume of new solvent, and continuing the dewatering for a further 24 hours.

TABLE 3

The Effect of Replacing the Solvent after 24 Hours.

| Test Number | Volume of Methanol (mL) | Initial Weight (g) | Residue (%) | % Water Removed |
|---|---|---|---|---|
| 8 | 30310 | 3019 | 0.6 | 27 |
| 9 | 150 | 15 | 1.4 | 29* |

*An additional step with acetone removed another 0.4% water

By comparing the results of Table 1 with Table 3 it can be seen that a small amount of water is removed in the second 24 hours period when new solvent is added (i.e. 28-29% versus 25-26%). This appears to indicate that a buildup of water in the methanol was preventing some of the water from being removed. The table also shows that similar results were obtained for 15 grams and 3 kg. Following the two exposures to methanol test number 9 was then exposed to acetone for a further 24 hours and dried at 125° C. for 24 hours. Based on the weight loss data another 0.4% of water was removed. Acetone was effective at removing water but also removed more polymer than methanol (see table 7 below). Acetone may be used in rubber testing to remove additives such as rubber resins, free sulphur, acetone soluble plasticizers, processing aids, mineral oils, or waxes, acetone soluble antioxidants and organic accelerators or their decomposition products, and fatty acids, which are generally present in rubber compounds. Most of these compounds are however removed during the devulcanization process as the residue from both the methanol and acetone extractions was shown to be polymer.

From Table 3 it can be seen that greater than 90% of the water is removed from the sample after two treatments with methanol. It is noted that the samples were found to have 30% weight of water total prior to treatment by drying at 110° C.

The residue from the tests was evaluated by both 13C NMR and FTIR. Both tests showed that the residue was polymer consistent with natural rubber (NR) and styrene-butadiene rubber (SBR).

In Table 4 the effect of adding water to the methanol before the dewatering process is started is explored, that is controlling the amount of water removed from the devulcanized rubber by increasing the water content in the methanol at the start of the test. Solvent solutions containing various levels of water and methanol were added to the devulcanized rubber and allowed to remain in contact with it for 24 hrs. At the end of the time the solution was removed and new solution added for a further 24 hrs. In test 14* the solution was not replaced at the end of the 24 hour period.

TABLE 4

Controlling the Amount of Water Removed by Adding Water to the Solvent

| Test Number | Volume of Methanol (mL) | Volume of Water added to the Methanol (mL) | Mass fraction of water | Initial Weight (g) | Residue (%) | Water Removed (%) | Mole fraction of water |
|---|---|---|---|---|---|---|---|
| 10 | 1500 | 0 | 0 | 150 | 1.3 | 28 | 0 |
| 11 | 1275 | 225 | 0.18 | 150 | 0.34 | 27 | 0.28 |
| 12 | 1125 | 375 | 0.30 | 150 | 0.28 | 23 | 0.43 |
| 13 | 750 | 750 | 0.56 | 150 | 0.27 | 21 | 0.69 |
| 14* | 75 | 75 | 0.56 | 15 | 0.1 | 14 | 0.69 |
| 15 | 0 | 1500 | 1.0 | 150 | 0 | 14 | 1.0 |

Figure 2:
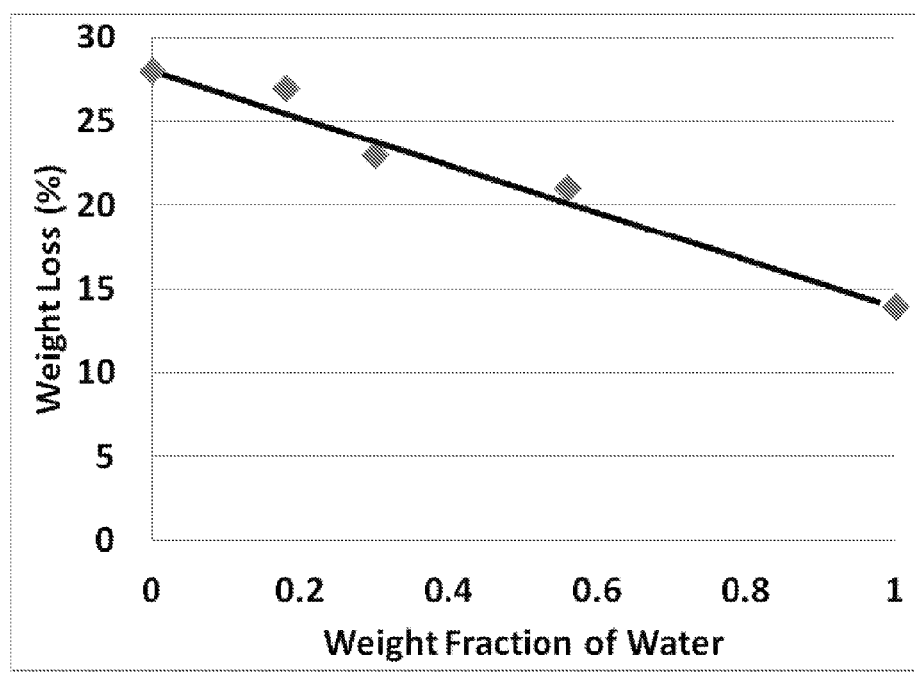
FIG. 2 depicts the effect of the weight fraction of water in the solvent solution on the amount of water removed.

Tables 4 and FIG. 2 show that the amount of water removed can be controlled by adding water to the solvent before the process is started. The table also shows that while the water level in the solvent can be relatively high at the start of the process (e.g. test 13), the methanol/water mix still has a high affinity for the water present in the devulcanized rubber, and although it does not remove all the water it removes a large portion of it. It can also be seen that adding water to the solvent reduces the amount of residue (other components in the rubber that are removed) and that even relatively small amounts (c.f. example 11) can have a big effect.

In Table 4, sample 15 was immersed in water for 2 days and then air dried. The weight loss (i.e. air drying for 2 days) was the same as that had the original sample simply been air dried.

It was noted that the weight of sample 10 after 2 days immersion in methanol (and then towel dried) was very close to the weight when the sample was first put into the methanol. This appears to indicate that the methanol molecules are replacing the water molecules in the devulcanized rubber, not simply extracting them. This also appears to indicate that the methanol molecules, once they are in the rubber, can be removed more easily by air drying the sample at room temperature than the water molecules.

In general terms about half of the water in the devulcanized rubber sample could be removed by air drying it at room temperature. The other half could not. However, if the water molecules were first replaced by methanol molecules, substantially all the water could be removed by air drying it at room temperature.

It was also noted that sample 13 increased in weight by 15% when it was immersed in the methanol/water mixture and then towel dried. This means that the methanol molecules are not only replacing the water molecules in the devulcanized rubber but in some cases are mixing with the water. This also shows the rubber is swelling to accommodate the increased volume of liquid inside it and could affect processing times.

It is also instructive to compare samples 13 and 14. Sample 13 was immersed in a 50/50 water methanol solution for 24 hours and then at the end of the time the solution was replaced with a new one and lost 21% water. Sample 14 was only immersed in the 50/50 solution for 24 hours and lost 14% water (similar to air drying). This appears to suggest that longer exposures are required when working with water/methanol solutions to displace the more strongly bound water.

FIG. 2 shows that by varying the water to methanol ratio, the amount of water that is removed can be varied.

In the next set of experiments the effect of controlling the amount of water removed during the process on the rheology of the sample is illustrated.

The rheometer described in American Society for Testing Materials (ASTM) Test D-6204: Test Methods for Rubber-Measurement of Un-vulcanized Rheological Properties Using Rotorless Shear Rheometers, and American Society for Testing Materials (ASTM) Test D-6048: Standard Practice for Stress Relaxation Testing of Raw Rubber, Unvulcanized Rubber Compounds, and Thermoplastic Elastomers, both of which are hereby incorporated by reference in their entirety, provides the capability to differentiate between the viscous and elastic components of the viscosity. The described rheometer measures G' the storage shear modulus, and G" the loss shear modulus, at a defined temperature and oscillation frequency ($\omega$) as a function of strain. The complex shear modulus G* can be calculated from G' and G" and the real dynamic viscosity ($\eta$) and the dynamic complex viscosity ($\eta$*) can be calculated by dividing G" and G* by $\omega$ respectively. To compare the elastic and viscous components of the viscosity of various samples, G' and G" can be compared at a defined temperature, for example 60° C., oscillation frequency, for example 1.667 Hz, and strain, for example 40% for G' and for G" (40% was chosen to avoid the "Payne Effect").

The next table looks at how the amount of water removed affects the rheology (G' and G") of the samples. The first line in the table represents the devulcanized rubber that was dried at 110° C. without prior treatment using a solvent.

TABLE 6

Effect of Water Removed on the Rheology of the Sample A

| Test Number | Water Removed (%) | G' at 40% Strain | G" at 40% Strain |
|---|---|---|---|
| Dried at 110° C. | 30 | 121 | 43 |
| 9 | 29 | 81 | 40 |
| 10 | 28 | 80 | 36 |
| 8 | 27 | 63 | 30 |
| 11 | 27 | 63 | 36 |

TABLE 6-continued

Effect of Water Removed on the Rheology of the Sample A

| Test Number | Water Removed (%) | G' at 40% Strain | G" at 40% Strain |
|---|---|---|---|
| 12 | 23 | 69 | 37 |
| 13 | 21 | 70 | 34 |
| 15 | 14 | 35 | 15 |

Figure 3:
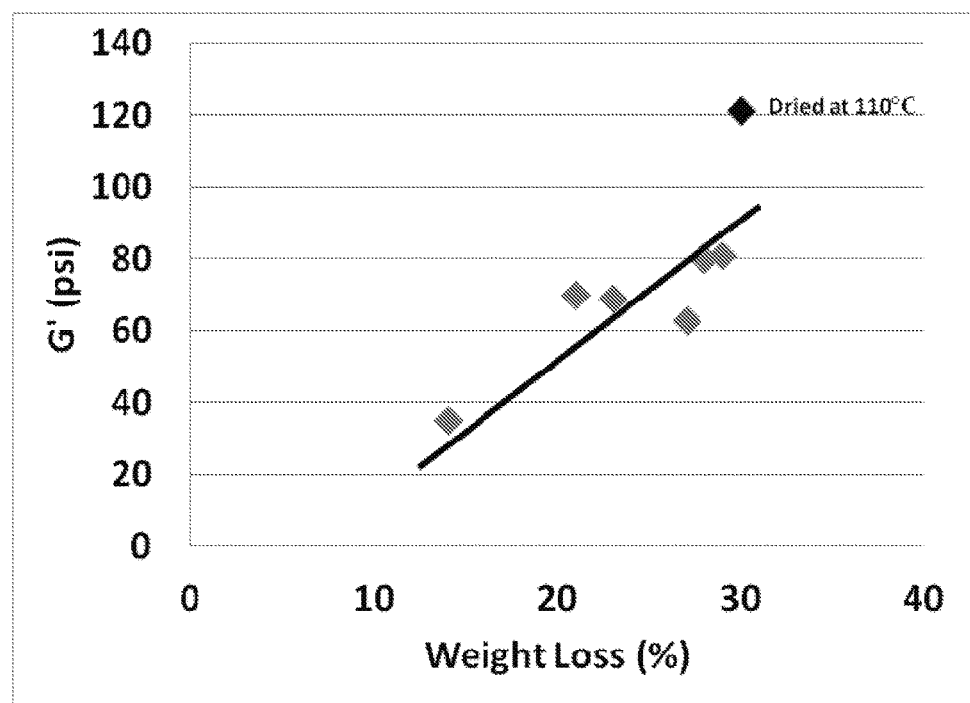
FIG. 3 depicts the effect of weight loss on the rheology of a devulcanized rubber sample.

The table clearly shows that the rheology (viscosity) of the rubber changes significantly depending upon how much water is removed and shows that the process can be used to change the viscosity of the sample (see also FIG. 3). Table 6 and FIG. 3 also show that the devulcanized rubber is also much harder (higher G') when dried at 110° C.

In Table 7 the effect of solvent is explored.

TABLE 7

Effect of Solvent on the Amount of Water Removed and Amount of Residue

| Test Number | Solvent | Volume of Solvent (mL) | Initial Weight (g) | Residue (%) | % Water Removed |
|---|---|---|---|---|---|
| 15 | Methanol | 150 | 15 | 0.6 | 26 |
| 16 | Ethanol | 150 | 15 | 1.0 | 26 |
| 17 | n-propanol | 150 | 15 | 1.9 | 26 |
| 18 | isopropanol | 150 | 15 | 1.9 | 24 |
| 19 | Acetone | 150 | 15 | 2.3 | 28 |
| 20 | acetonitrile | 150 | 15 | 0.5 | 29 |
| 21 | dimethylformamide | 150 | 15 | 1.2 | 24 |
| 22 | dimethylsulfoxide | 150 | 15 | 0.1 | 2* |
| 23 | dioxane | 150 | 15 | 5.4 | 29 |
| 24 | tetrahydrofuran | 150 | 15 | 11.7 | 30 |
| 25 | n-butanol | 150 | 15 | 3.1 | 26 |

*DMSO did not evaporate during the air drying process

Of the solvents that can be used, methanol, ethanol and acetonitrile seemed to be the most effective in that they removed most of the water without removing significant amounts of polymer, and it was easy to dry these samples at room temperature because of their high volatility/low boiling point. Dimethylsulfoxide was very difficult to remove from the samples after the test. While butanol is not completely miscible with water it can be seen to be quite effective at removing the water.

Sample B

Devulcanized rubber of Sample B was devulcanized at 250° C.

When samples of Sample B devulcanized rubber were dried in an oven at 110° C. they lost 38% of their weight, which was assumed to be water. When the samples were air dried at room temperature for two days to constant weight they lost 26% of their weight.

The table 8 looks at how the amount of water removed affects the rheology (G' and G") of these samples. The first line in the table represents the rubber dried at 110° C. instead of using a solvent.

TABLE 8

Effect of Water Removed on the Rheology of the Sample B

| Test Number | Water Removed (%) | G' at 40% Strain | G" at 40% Strain |
|---|---|---|---|
| 26 (Dried at 110° C.) | 38 | 99 | 33.4 |
| 27 | 34 | 55.2 | 26 |
| 28 | 28 | 69 | 32 |
| 29 | 26 | 57.9 | 28.9 |
| 30 | 24 | 49.7 | 30.1 |
| 31 | 22 | 49.1 | 23.6 |
| 32 | 24 | 45.8 | 25.1 |
| 33 | 18 | 29.1 | 15.1 |

Figure 4:
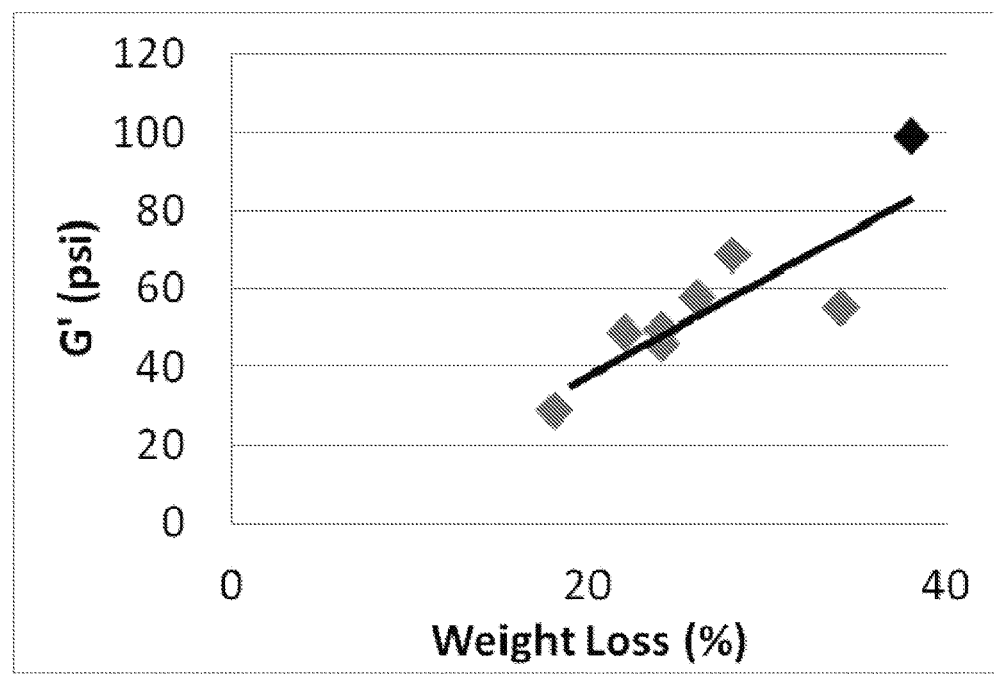
FIG. 4 depicts the effect of weight loss on the rheology of another devulcanized rubber sample.

Table 8 again shows that the rheology (viscosity) of the rubber changes significantly depending upon how much water is removed and shows that the process can be used to change the viscosity of the sample (see also FIG. 4). Table 8 and FIG. 4 also show that the devulcanized rubber is also harder (higher G') when dried at 110° C.

Additional tests were done with methanol and sample B. It was found out that the methanol molecules appeared to replace the water molecules in the rubber (when it immersed in methanol) and that this was partially reversible (i.e. once the water in the rubber had been replaced with methanol, the process was partially reversible, by then immersing it in water).

In the above process the objective is to remove the water from the devulcanized rubber while minimizing an amount of polymer removed (i.e. the solvent should minimize the residue). It is also desirable to have a solvent that is relatively volatile so it can be air dried at room temperature.

It will be apparent to one skilled in the art that the processing conditions presented here are only illustrative. The method may encompass those processing parameters i.e. temperature, time, solvent, water/solvent ratio, drying time, etc., that allows for to dissolving a portion of the water from the devulcanized rubber. The solvent used may be mixed with water. The portion of the water removed from the devulcanized rubber may depend upon the desired rheology of the dewatered devulcanized rubber, and/or an amount of water remaining in the dewatered and devulcanized rubber.

While the dewatering process has been described according to what is presently considered to be the most practical and preferred embodiments, it must be understood that the process is not limited to the disclosed embodiments. Those of ordinarily skilled in the art will understand that various modifications and equivalent structures and functions may be made without departing from the spirit and scope of the current teachings as defined in the claims. Variations in the dewatering process are possible in light of the description of it provided herein.

What is claimed is:

1. A method of dewatering devulcanized rubber comprising:
   bringing devulcanized rubber having an initial water content and a water-soluble solvent into contact;
   maintaining the devulcanized rubber-solvent contact for a period of time sufficient to dissolve a portion of the water within devulcanized rubber into the solvent, thereby lowering the water content of the devulcanized rubber and increasing a concentration of water in the solvent;
   separating the devulcanized rubber and the water-soluble solvent with the portion of the water dissolved from within the devulcanized rubber to provide devulcanized rubber having a water content lower than the initial water content of the devulcanized rubber; and
   drying the devulcanized rubber.

2. The method of claim 1, wherein the solvent is a polar solvent.

3. The method of claim 1, wherein the solvent is in a solvent solution.

4. The method of claim 3, wherein the solvent solution is a solution of the solvent and water.

5. The method of claim 4, wherein an amount of water in the solvent solution is used to control an amount of water dissolved from the devulcanized rubber.

6. The method of claim 3, wherein the solvent solution is a solution of the solvent and a second solvent.

7. The method of claim 1, wherein the solvent has a low affinity for rubber polymers.

8. The method of claim 1, wherein the solvent is at least one of methanol, ethanol, propanol, acetone, acetonitrile, dimethylformamide, dioxane, and butanol.

9. The method of claim 8, wherein the solvent is at least one of methanol, ethanol, and acetonitrile.

10. The method of claim 9, wherein the solvent is methanol.

11. The method of claim 1, wherein the solvent is miscible in water.

12. The method of claim 1, wherein the solvent is volatile.

13. The method of claim 1, wherein the devulcanized rubber has about 15% to about 40% water prior to dewatering.

14. The method of claim 1, wherein dewatering the devulcanized rubber removes sufficient water to meet a desired rubber specification.

15. The method of claim 14, wherein treated devulcanized rubber has less than about 10% water after drying.

16. The method of claim 15, wherein treated devulcanized rubber has less than about 5% water after drying.

17. The method of claim 1, wherein the devulcanized rubber has a particle size of 1 cm or less.

18. The method of claim 1, further comprising:
treating the devulcanized rubber with additional solvent prior to drying the devulcanized rubber to dissolve additional water; and
separating the devulcanized rubber and additional solvent prior to drying.

19. The method of claim 1, further comprising:
treating the devulcanized rubber with additional solvent after drying to dissolve additional water;
separating the devulcanized rubber and additional solvent; and
drying the devulcanized rubber.

* * * * *